Nov. 13, 1962        H. BECKER        3,063,738

COUPLING FOR VEHICLES, ESPECIALLY FOR TRACTORS

Filed Jan. 5, 1961        2 Sheets-Sheet 1

Nov. 13, 1962  H. BECKER  3,063,738
COUPLING FOR VEHICLES, ESPECIALLY FOR TRACTORS
Filed Jan. 5, 1961  2 Sheets-Sheet 2

United States Patent Office 3,063,738
Patented Nov. 13, 1962

3,063,738
COUPLING FOR VEHICLES, ESPECIALLY
FOR TRACTORS
Hans Becker, Dusseldorf, Germany, assignor to Toussaint & Hess Hydraulische Hebezeugfabrik G.m.b.H., Dusseldorf, Germany
Filed Jan. 5, 1961, Ser. No. 80,870
Claims priority, application Germany January 9, 1960
1 Claim. (Cl. 280—434)

This invention relates to a coupling for vehicles, especially for tractors, having a vertical coupling pin on the one vehicle which is introduced into a horizontal slot on the other vehicle and is fixed in the slot by a swingable coupling member which engages over the slot and is mounted with clearance on its pivot and partly surrounds the pin, the swingable bolt being pressed against the pin towards the closed end of the slot by a key way which is supported against a fixed abutment and likewise engages over the slot. If, in couplings of this kind, the clearance of the swingable coupling member on its pivot is sufficiently great, this ensures that even after considerable wear has occurred, the coupling member will be pressed by the key firmly against the pin and the latter in turn will be pressed firmly against the end of the slot. This, however, applies only when the forces acting on the pin are approximately at right angles to the wedge surfaces along which the coupling member and key are in contact.

The above-mentioned condition is always fulfilled when travelling over a straight course. With travelling around curves, however, forces occur which have components parallel to the plane of contact between the key and the coupling member and can assume very considerable values depending on the speed and on the inclination of the curve which is always only approximately adapted to suit the speed and is frequently not present at all. When these components exceed the frictional force between the wedge surfaces of the key and the coupling member, the play between the swingable coupling member and its pivot enables the coupling pin, together with the coupling member, to move parallel to the wedge surfaces. This leads to shaking of the coupling, and the pin and the side walls of the slot are flattened.

The object of the invention is to obviate this disadvantage. According to the invention, the coupling member is mounted on its pivot so as to have play only in a direction at right angles to the surface of contact between the key and coupling member. This can be done, for example, by guiding the coupling member on its pivot in an elongated slot which, in the coupling position, has its largest dimension at right angles to the surface of the key.

In a known coupling of the type previously mentioned, the wedge surfaces along which the key and the coupling member are in contact when in the coupled position, is not at right angles to the direction of the slot but is slightly inclined to it. Unsymmetrical conditions are thereby established and these can lead, in the course of time, to shaking movements due to the play in the bearing of the coupling member even when traveling on a straight course. In order also to obviate this disadvantage, the wedge surfaces, in a preferred form of construction, are at right angles to the slot.

A preferred embodiment of the invention is illustrated diagrammatically, and by way of example, in the accompanying drawings, in which.

Figure 1:
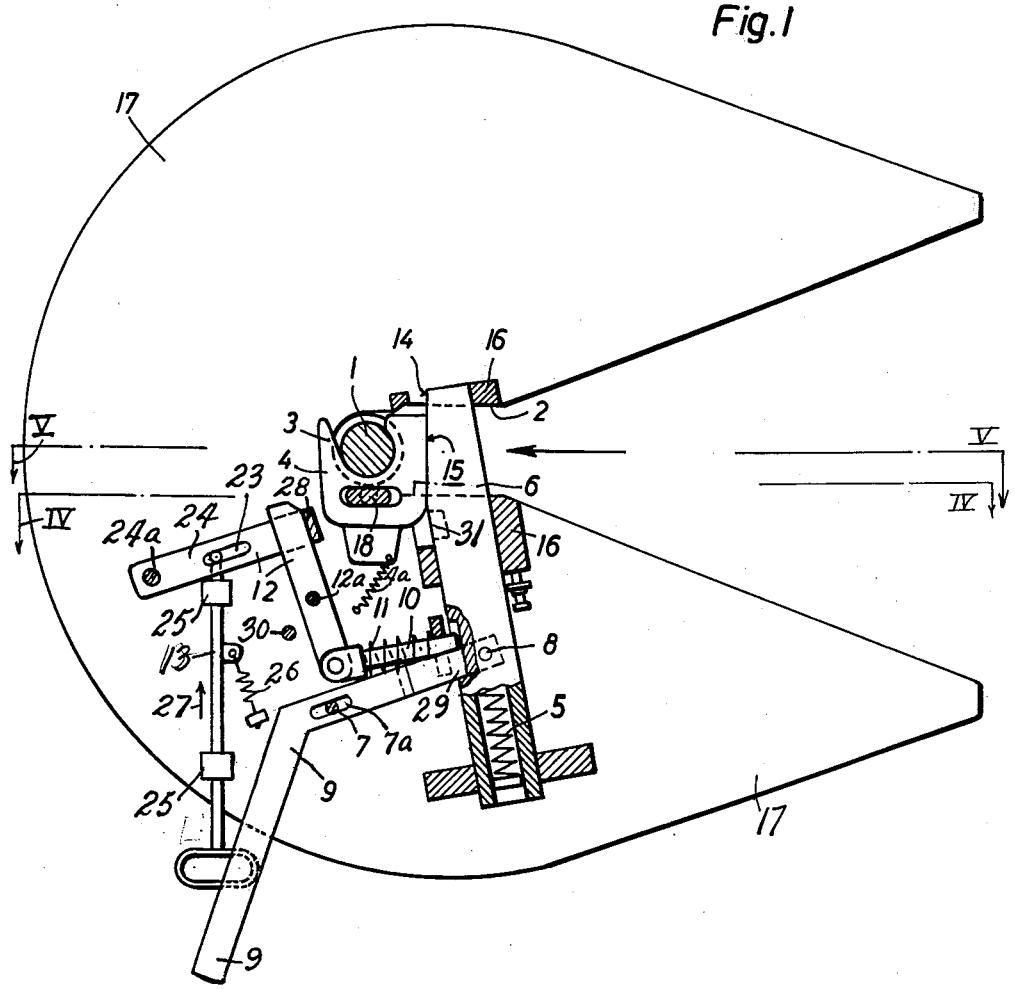
FIG. 1 is a plan from below taken along line I—I of FIG. 4 and showing a coupling having the features of the invention in the coupled position.

The drawings show the part of the coupling which is disposed on the tractor. A pin 1, which is seen in section in FIG. 1, projects downwardly from a carrier which is situated beyond the plane of the drawing. The part of the coupling belonging to the tractor has the usual slot 2 which widens out and is open towards the rear, whereas the front end 3 of the slot is closed. The pin 1 moves into this slot when the coupling is connected, the tractor moving backwards so as to under-lap the carrier. When the pin 1 has arrived in the end position, illustrated in FIGS. 1 and 2, it is fixed by a swinging coupling member 4. After this, the coupling member itself is secured by a key 6 which is under the action of a spring 5. In order to disconnect the coupling, the key 6 can be withdrawn against the action of the spring 5 by a lever 9 which is rotatable by means of an elongated hole 7a about a pivot 7 and engages the key at the point 8. In its securing position and also in its retracted position the key itself is secured by a pin 10 engageable at catch 29 of key 6 and which can be released against the action of a spring 11 by a linkage 12, 24 and a pull rod 13. The lever 24 is pivoted at 24a and is connected to rod 13 by means of an elongated slot 23. Rod 13 is longitudinally slidable in two bearing members 25 and is urged in opposition to arrow 27 by means of a spring 26. Lever 24 is bent at its free end into an L-shape or hook 28 which engages the right lateral surface of one arm of lever 12. In the illustrated position of FIG. 1, therefore, the spring 11 cannot pull the pin 10 out of the catch 29 of key 6. Consequently the key 6 remains secured.

In the secured position, the wedge surface 14 of the key 6 bears against a surface 15 of the swingable member 4 which, like the surface of the key, lies at right angles to the slot 2 and, therefore, to the direction of travel when travelling in a straight line. Consequently, the direction in which the key 6 is movable is inclined at an acute angle to the slot 2. The spring 4a urges the coupling member 4 in a clockwise direction about pivot 18. The key 6 is supported in its securing position against fixed abutments 16 which are mounted on the base plate 17 of the tractor part of the coupling.

Figure 4:
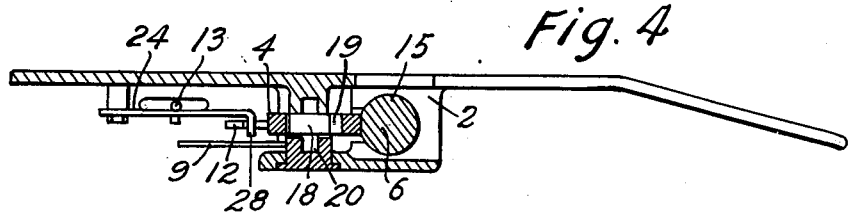
FIG. 4 is a cross section taken along line IV—IV of FIG. 1.
Figure 5:
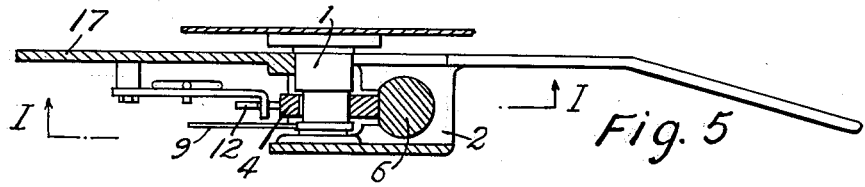
FIG. 5 is a cross section taken along line V—V of FIG. 1.
Figure 2:
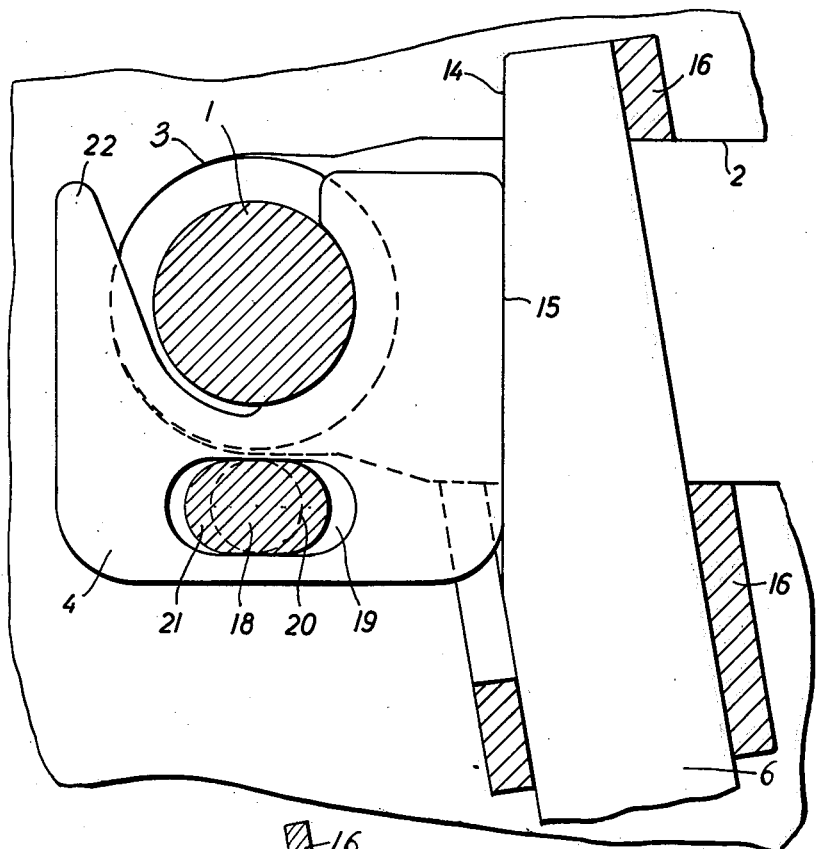
FIG. 2 is a detail of part of FIG. 1 on a larger scale, also in the coupled position.

As shown in particular in FIG. 2, the swingable coupling member 4 is guided on its pivot 18 by means of an oblong hole 19, the largest dimension of which is at right angles to the surface 15. As shown in FIG. 4, the lower cylindrical part 20 of the pin 18 can turn in a hole in the base plate 17. On the other hand, the part 21 of the pin which is situated in the hole 19 is similarly oblong, but its greatest dimension is smaller than that of the oblong hole.

The oblong hole 19 enables the swinging coupling member 4 to have a freedom of movement at right angles to the surfaces 14 and 15. This ensures that the pin 1 is pressed free from play by the pressure of the key 6 against the end 3 of the slot 2. The swingable coupling member 4, however, does not have any play parallel to the surfaces 14 and 15 except that due to unavoidable manufacturing inaccuracies and tolerances. In this way, member 4 is prevented from making movements at right angles to the slot as could otherwise occur under the action of the transverse components of the tensile forces when these become greater than the frictional force between the surfaces 14 and 15.

The object of the oblong head 21 of the pin 18 is to make surface contact with the oblong hole and thereby to keep the superficial pressure low in the transverse direction.

Figure 3:
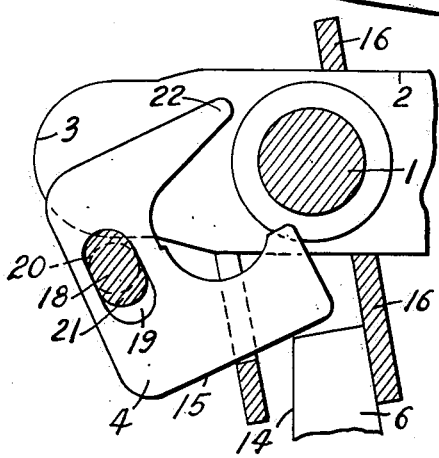
FIG. 3 is a view similar to FIG. 2 in the uncoupled position.

If the coupling is to be released, the rod 13 is displaced in the direction of the arrow 27. The hooked end 28 of lever 24 then moves toward the right relative to FIGS. 1 and 4 so as to release the lever 12, which can now pivot clockwise under the compressive force of spring 11, thus withdrawing pin 10. A fixed stop pin 30 is provided on plate 6 to limit the rotation of lever 12 about its pivot 12a and thus to control the travel distance of pin 10. After the pin 10 has left the catch 29, the key 6 can then be pulled outwardly by means of lever 9 moving in a clockwise direction about pivot 7. In its new, outwardly withdrawn position, the key 6 can again be secured by the same pin 10 which engages another catch 31 as follows. When the catch 31 is located in front of the pin 10 release of the handle on the end of rod 13 permits rod 13 to slide in opposition to arrow 27 because of spring 26, thus resulting in lever 24 swinging lever 12 counterclockwise to insert pin 10 into the catch 31 in opposition to the force of spring 11. When the key 6 is withdrawn into the position shown in FIG. 3, the coupling can be released by moving the vehicles apart one from the other. The pin 1 thereby rotates the coupling member 4 into the position shown in FIG. 3. The coupling is engaged in the manner previously described. Then, the pin 1 meets a projection 22 on the coupling member 4 and brings this into the position shown in FIG. 1. After this, when the key 6 is to be returned into closing position, rod 13 is merely displaced in the direction of arrow 27. Everything else relative to closing and locking the coupling will then occur automatically under the action of spring 5. In other words, when the pin 10 is released the key 6 can be freed so that it is transferred into the securing position by the action of the spring 5.

I claim:

A coupling for power vehicles, particularly for tractors and trailers wherein a vertical coupling pin is provided on one vehicle, comprising means on the other vehicle forming a slot having a closed end for receiving said pin, a swingable coupling member arranged on said other vehicle to overlap said slot and adapted to engage said pin for retaining said pin at said slot end, a stationary pivot for said member, the latter being mounted for rotation about the axis of said pivot and forming a mounting means to permit play of said swingable member relative to said pivot axis, key means slidably mounted on said other vehicle and having a planar contact surface for engaging said swingable coupling member so as to urge the latter in a direction to press said pin toward said closed slot end when in coupling position, fixed abutment means for supporting said key means so that the latter overlaps said slot when engaging said swingable coupling member, said mounting means of said swingable coupling member being provided with an elongated aperture having its greater dimension at approximately a right angle to said contact surface when said member is in coupling position so as to restrict said play of said swingable member to move only in a direction at right angles to said contact surface when said key means and coupling member are engaged in said coupling position.

References Cited in the file of this patent

UNITED STATES PATENTS

| | | |
|---|---|---|
| 2,431,779 | Stevens | Dec. 2, 1947 |
| 2,828,326 | Georgi | June 10, 1958 |
| 2,977,137 | Durham | Mar. 28, 1961 |